(12) United States Patent
Battistella et al.

(10) Patent No.: US 8,220,834 B2
(45) Date of Patent: Jul. 17, 2012

(54) STEERING COLUMN ARRANGEMENT FOR MOTOR VEHICLES

(75) Inventors: Denis Battistella, Milan (IT); Kornél Kantor, Kecskemét (HU); Gary Jones, Bristol (GB); Michael Muser, Pfaffenhofen (DE); Juergen Stocker, Stuttgart (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/830,952

(22) Filed: Jul. 6, 2010

(65) Prior Publication Data
US 2011/0121553 A1      May 26, 2011

(30) Foreign Application Priority Data

Jan. 11, 2008   (DE) .......................... 10 2008 004 192

(51) Int. Cl.
  *B62D 1/00*      (2006.01)
(52) U.S. Cl. ....................................... 280/777
(58) Field of Classification Search ................. 280/775, 280/777, 779; 74/492, 493
See application file for complete search history.

(56) References Cited

U.S. PATENT DOCUMENTS

| 3,429,196 | A | | 2/1969 | White |
| 3,520,209 | A | * | 7/1970 | Cescone .......................... 74/493 |
| 4,228,695 | A | | 10/1980 | Trevisson et al. |
| 4,365,825 | A | * | 12/1982 | Merkle .......................... 280/777 |
| 4,616,522 | A | * | 10/1986 | White et al. ...................... 74/492 |
| 4,895,390 | A | * | 1/1990 | Fujikawa et al. ............. 280/777 |
| 4,966,391 | A | | 10/1990 | Sobodos et al. |
| 5,737,970 | A | | 4/1998 | Asbrand et al. |

FOREIGN PATENT DOCUMENTS

| DE | 27 51 068 | 12/1978 |
| DE | 33 28 283 | 2/1985 |
| DE | 195 22 389 | 9/1996 |
| DE | 10 2005 022 408 | 11/2006 |
| DE | 10 2008 004 192 | 2/2010 |
| GB | 2 015 446 | 9/1979 |
| GB | 2 406 314 | 3/2005 |

* cited by examiner

*Primary Examiner* — Paul N Dickson
*Assistant Examiner* — Robert A Coker
(74) *Attorney, Agent, or Firm* — Kenyon & Kenyon LLP

(57) ABSTRACT

A steering column arrangement including a steering column and a steering wheel, which is oriented at an angle to a horizontal, in which the steering column is connected to at least two pivoted levers, which each have a pivot bearing at both ends, the pivot bearings situated on the side of the pivoted levers remote from the steering wheel being fixedly attached, while the pivot bearings attached to the other end of the pivoted levers are arranged at a reciprocal distance from the steering column, the arrangement of the pivoted levers and the pivot bearings being selected so that under a force acting on the steering wheel in the direction of travel the steering wheel and steering column are moved simultaneously in the direction of travel and the steering wheel increases said angle.

12 Claims, 7 Drawing Sheets

STEERING COLUMN ARRANGEMENT FOR MOTOR VEHICLES

FIELD OF THE INVENTION

The present invention relates to a steering column arrangement for motor vehicles.

BACKGROUND INFORMATION

Such a steering column arrangement is discussed in German patent document DE 33 28 283 A1, for example.

The state of the art further discusses a number of safety steering columns, which in the event of an accident are intended to protect the driver of a motor vehicle from injuries caused by the steering wheel or the steering column. German patent document DE 195 22 389 C1, for example, discusses a safety steering column having a set bending point, which is capable of bending in the event of an accident in such a way that the steering column and the steering wheel do not come any nearer to the driver, even if vehicle body parts situated in front of the driver are displaced towards the driver.

German patent document DE 27 51 068 C2 also discusses a similar device, the steering wheel in this case being additionally connected to the steering column by deformable spokes, which in an accident are deformed in such a way that the plane of the steering wheel is aligned parallel to the plane of the driver's thorax.

Modern vehicles do not have steering wheels with such spokes, however, the steering wheels generally having a more extensive hub cap, often also accommodating an airbag. In contrast to automobiles the steering wheel in motor trucks is generally arranged relatively horizontally, that is to say a plane defined by the steering wheel extends at a relatively small angle to the plane of the roadway, whereas in automobiles this angle is substantially larger. As a result, in the event of an accident the lower area of the steering wheel, which is situated closer to the driver than the upper area of the steering wheel, collides with the upper abdomen or the thorax of the driver and due to its small area poses a considerable risk of injury.

In systems known through prior public use (the firms Scania and IVECO, for example) the steering column is capable of pivoting via a joint and in the event of an accident can therefore be pushed forwards in the direction of travel by the driver. Since the pivot joint is situated below the steering wheel, this pivoting causes the steering wheel to become even more horizontally aligned, thereby reducing the aforementioned angle still further and increasing the risk of injury. Reference is made to FIGS. 7 and 8 for explanation of this state of the art.

FIG. 7 shows a first steering column arrangement having a steering column 1, which is attached by a pivot joint 2 to a pedal unit 3 of the vehicle. A steering wheel 4, which in the normal driving position is inclined at an angle $\alpha$, is attached to the steering column 1. The steering column 1 is connected to the body of the vehicle by a damping element 5. In the event of an accident the driver with his upper body will first come into contact with the underside 6 of the steering wheel 4, thereby generating a force which is represented by an arrow 7. In the pivot joint 2 this force generates a torque which is represented by an arrow 8. The steering column 1 together with the steering wheel 4 can thereupon pivot into the position represented by dashed lines, deforming the damping element 5. It can be seen that the angle $\alpha$ is thereby reduced, which increases the surface unit pressure of the steering wheel against the driver and hence the risk of injury.

A similar system according is shown in FIG. 8. There the pivot bearing 2 is located closer to the steering wheel 4 and designed so that if a force threshold is exceeded it will allow pivoting, for example through a frictional connection in the pivot joint 2, although here too the angle $\alpha$ is reduced due to the pivoting.

It may be understood from the state of the art discussed as to FIGS. 7 and 8 that in the event of tensile forces, that is to say forces counter to the direction of the arrow 7, no pivoting is possible.

SUMMARY OF THE INVENTION

An object of the present invention is to create a steering column arrangement, in which the contact area between the steering wheel and the driver is increased in the event of an accident, and at the same time the steering wheel and the steering column, whilst absorbing energy, are distanced from the driver or follow the movement of the driver's body.

This object is achieved by the features described herein. Advantageous embodiments and developments of the present invention are described herein.

A principle of the present invention resides in a lever arrangement of at least two levers, which each have pivot joints on both sides, the steering column being connected to one end of each of the levers and the length and arrangement of the levers being selected so that a forwardly directed force exerted on the steering wheel pivots the levers, so that the steering wheel moves in the direction of the force and at the same time increases its angle ($\alpha$) in relation to the plane of the roadway.

The present invention will be explained in more detail below with reference to an exemplary embodiment in conjunction with the drawings.

DETAILED DESCRIPTION

Figure 1:
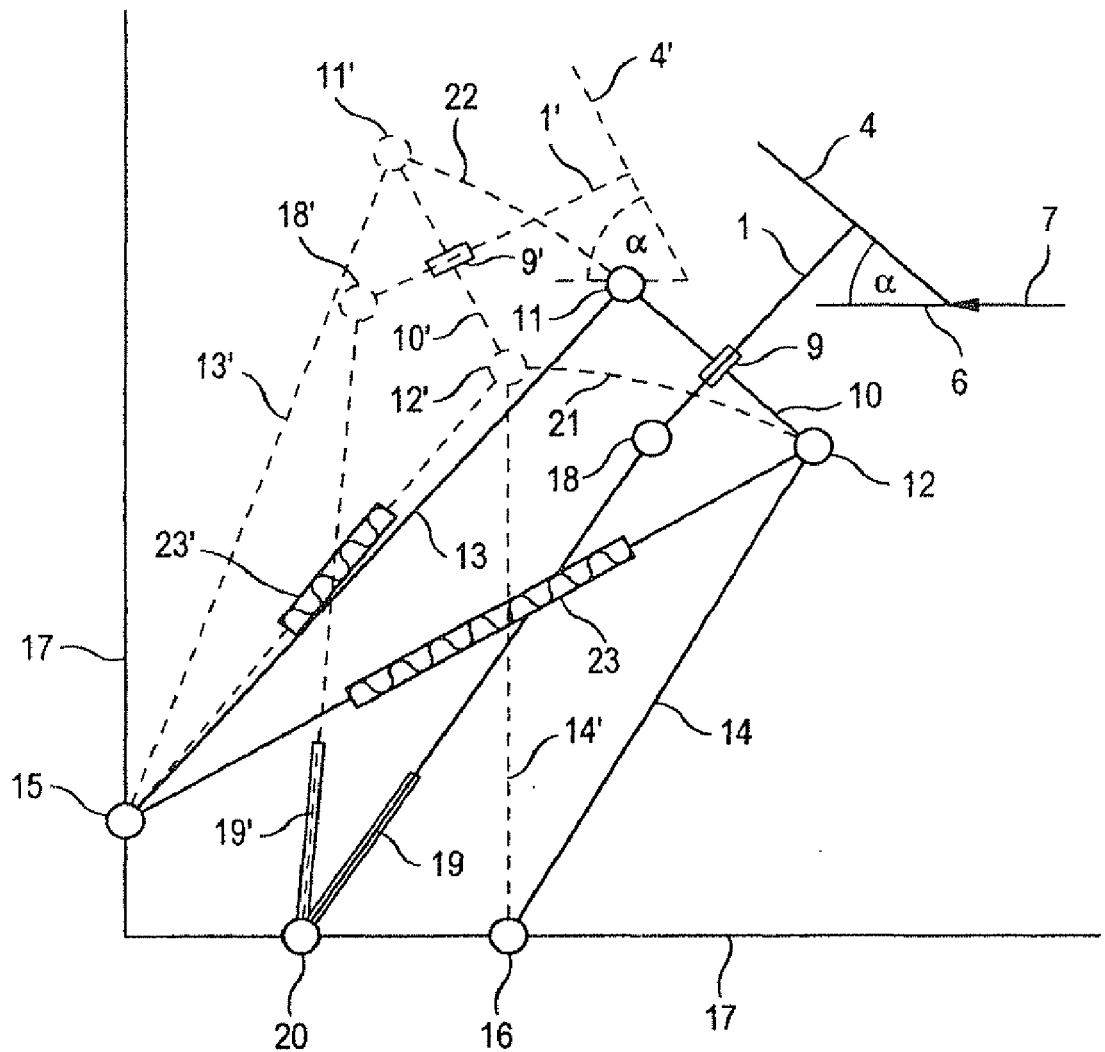
FIG. 1 shows a schematic diagram of the steering column arrangement according to the present invention.

FIG. 1 in a diagrammatic sketch illustrates a basic principle of the exemplary embodiments and/or exemplary methods of the present invention.

As in the state of the art, the steering wheel 4, which in the driving position represented by solid lines forms an angle $\alpha$ with a horizontal, which is usually the running plane of the vehicle, is attached to the steering column 1. The steering column is supported by a bearing 9 so that it can rotate on a cross member 10, the bearing being angularly rigid, that is to say the steering column 1 is always at a constant angle to the cross member 10. The two ends of the cross member 10 are each connected by pivot bearings 11 and 12 to a pivoted lever 13 and 14, the other ends of which are connected by pivot bearings 15 and 16 to fixed parts 17 of the vehicle, which might be a wall of the driver's cab or a pedal unit, for example.

The steering column 1 is connected by a further joint 18, usually a universal joint, to a telescopic rod 19, which is connected by a further joint 20, which may likewise be a universal joint, to further elements (not shown) of the vehicle steering.

In the event of an accident the driver of the vehicle is impelled forwards in the direction of the arrow 7 and with his abdomen or thorax comes into contact with the underside 6 of the steering wheel 4, thereby exerting a force component acting in the direction of the arrow 7 on the steering wheel, which is rigidly connected to the steering column 1, which in turn has an angularly rigid connection to the cross member 10. This force acts via the two pivot bearings 11 and 12 on the pivoted levers 13 and 14, which are able to pivot via their respective pivot bearings 15 and 16. The pivot bearing 11 is therefore able to move on a circular arc-shaped path 21, the center of which is situated in the pivot bearing 15 and the radius of which corresponds to the length of the pivoted lever 13. Similarly the pivot bearing 12 can move on a circular arc-shaped path 22, the center of which is situated in the pivot bearing 16 and the radius of which corresponds to the length of the pivoted lever 14. Since the two pivot bearings 11 and 12 are kept at a constant distance from one another by the cross member 10, this produces a positive guidance on a clearly predefined path, as a result of which the cross member 10 varies its angular position or spatial orientation, so that the steering column 1 and the steering wheel 4 also vary their angular position, in such a way that the angle $\alpha$ increases and thereby conforms better to the driver's body, in order to bring the overall impact area of the steering wheel into contact with the driver's body.

In the movement described the joint 18 is also forcibly displaced, as can be seen from FIG. 1, which results in a variation in the length of the telescopic rod 19. It will be clear to the person skilled in the art that alternatively, or in addition to this, the steering column 1 may also be of telescopic design in the area between the bearings 9 and 18. The cross member 10 may also be an integral component of the steering column 1.

The movement described above must obviously take place only when the force acting in the direction of the arrow 7 has exceeded a predetermined value. This can be achieved in various ways. According to one exemplary embodiment of the present invention a damping element 23 is provided, which connects at least one of the elements 9, 10, 11, 12 or 13 to a fixed part 17. As an example FIG. 1 shows a damping element 23, which connects the two bearings 12 and 15 together. When a force threshold is exceeded, this damping element is able to vary its length by collapsing as it absorbs kinetic energy, thereby permitting the movement described. For example, it may take the form of a deformable plate, which buckles under a specific buckling load and thereby reduces kinetic energy. A spring-preloaded piston or a pneumatically or hydraulically acting piston-cylinder arrangement with spring-preloaded valves is also possible.

According to another alternative the pivot bearings 11, 12, and 16 may also be designed so that they allow a pivoting movement only when a predefined torque is exceeded, which can be achieved by pivot bearings having a frictional connection, for example.

To sum up, it will be seen from FIG. 1 that in the event of an accident, with force acting on the steering wheel in the direction of the arrow 7, the steering wheel 4 not only varies its spatial position, that is to say it is pushed forwards in the direction of the arrow 7 and hence away from the driver's seat, but in addition also varies its angular position so that the angle $\alpha$ of the steering wheel 4 increases and the steering wheel therefore assumes a more vertical position.

It will be evident to the person skilled in the art that the position and hence the distances between the pivot bearings 11, 12, 15 and 16 and thereby also the length of the pivoted levers 13 and 14 together with the length of the cross member 10 must be selected so as to produce the desired adjustment of the angle $\alpha$ of the steering wheel 4, and that the displacement travel of the steering wheel in the direction of the arrow 7 must also be limited, so that in the final position the driver's head also still remains at a distance from the vehicle windshield. The increase in the angle $\alpha$ must also be selected so that the angle $\alpha$ can be adjusted to the position of the driver's upper body in the event of an accident, consistent with the normal sitting position of the driver, which is also defined by the distance between seat and steering wheel. This means, for example, that the steering wheel must not be vertically upright (angle $\alpha$ would then be 90°), since the top edge of the steering wheel would then act on the driver with increased surface unit pressure.

It will further be evident to the person skilled in the art that the pivot bearings 11, 12, 15 and 16 must not be arranged so as to produce a parallelogram, that is to say the connecting line between the pivot bearings 15 and 16 must not lie parallel to the line connecting the bearings 11 and 12, i.e. parallel to the cross member 10, since otherwise no angular adjustment of the angle $\alpha$ would ensue.

Figure 2:
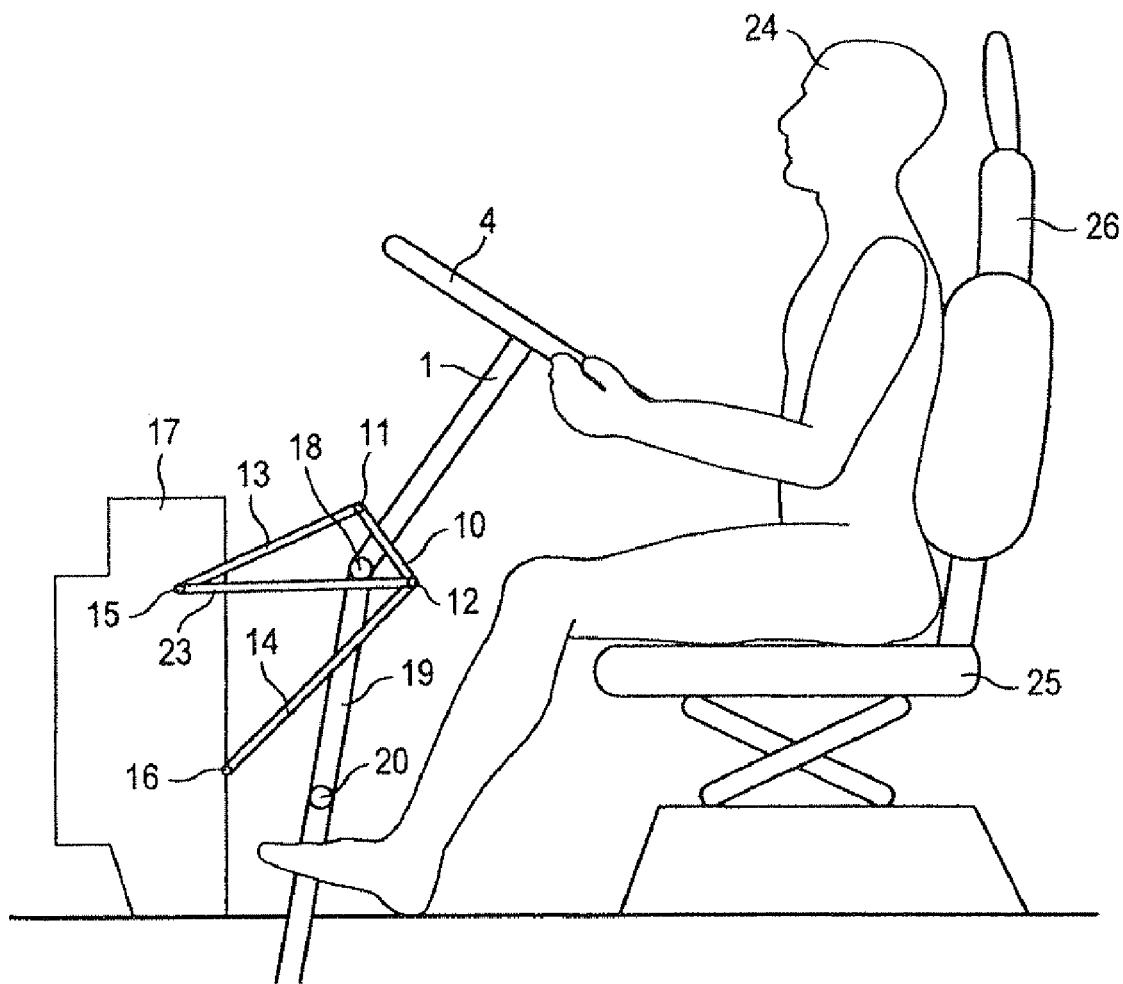
FIG. 2 shows a schematic side view of the steering column arrangement according to the present invention with a driver.

FIG. 2 shows a schematic side view of the steering column arrangement according to the exemplary embodiments and/or exemplary methods of the present invention in which the position of a driver 24 and a seat 25 having a backrest 26 are represented. The upper pivoted lever 13 is articulated by its pivot bearing 15 on a fixed part, which in this case is a pedal unit 17. The lower pivot bearing of the lower pivoted lever 14 is likewise fixed to the pedal unit. The damping element 23 here lies between the two pivot bearings 12 and 15. The other parts with their reference numerals have been explained in detail in connection with FIG. 1, so a further detailed description is superfluous.

Figure 3:
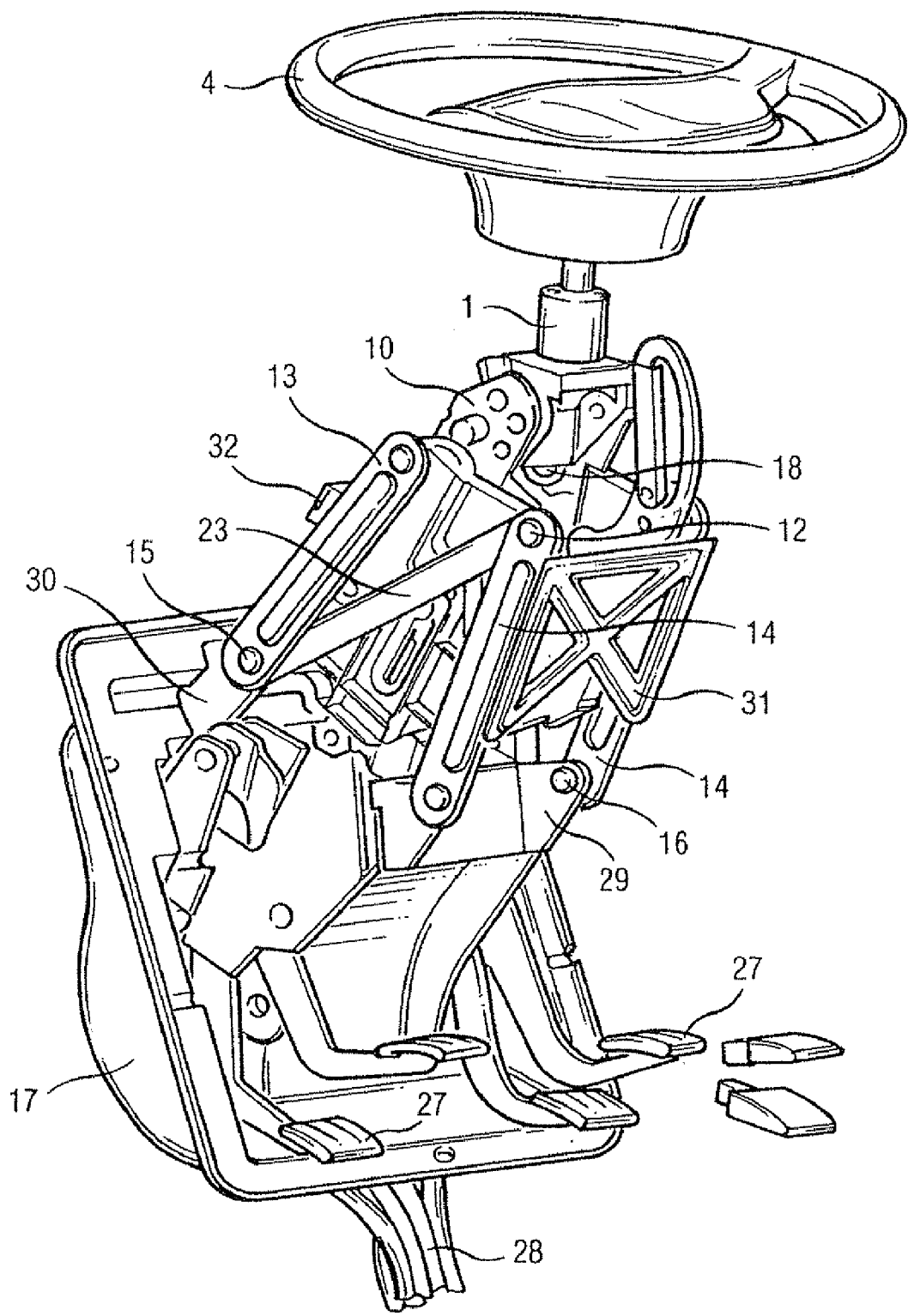
FIG. 3 shows an actual exemplary embodiment of a steering column arrangement according to the present invention.
Figure 4A:
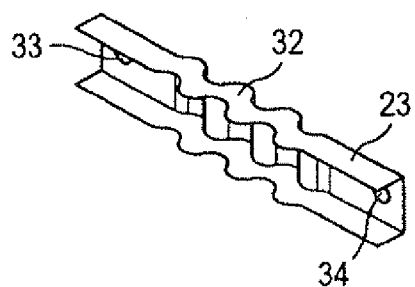
FIG. 4 shows different variants of damping elements used in the present invention.
Figure 4B:
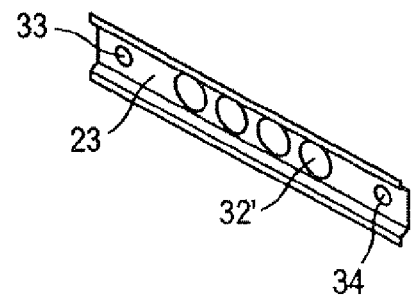
Figure 4C:
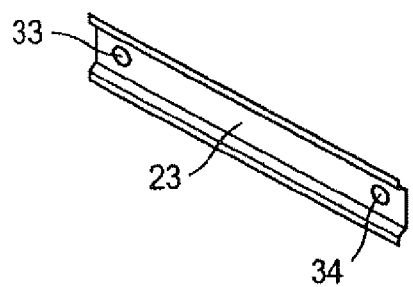
Figure 4D:
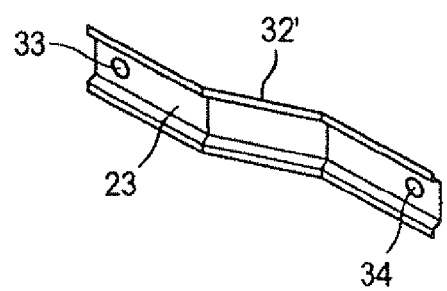
Figure 4E:
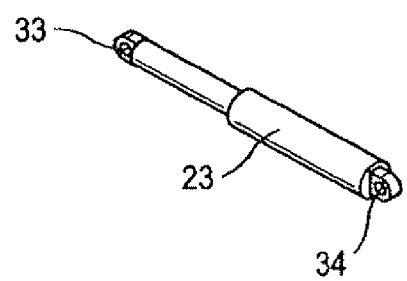

FIG. 3 shows an actual exemplary embodiment of a steering column arrangement according to the present invention, which here is connected to a pedal unit 17. The pedal unit 17 comprises the usual pedals 27 and is supplied together with the complete steering column arrangement as a standard fitting, which can be inserted into the body of a vehicle and via cables 28 establishes the usual electrical connections to the steering wheel, and where necessary to the pedals and the switches, transducers and sensors provided there.

In this practical embodiment the pivoted levers 13 and 14 and also the damping element 23 are each duplicated, that is to say they are arranged in mirror-symmetrical pairs about a plane of symmetry passing through the steering column 1. The pivot bearings 15 and 16 are fixed to corresponding members 29 and 30, which are connected to the pedal unit 17. The two lower pivoted levers 14 are connected together by a stabilizing plate 31 and the two pivoted levers 13 are connected together by a stabilizing plate 32, in order to give the overall arrangement the necessary transverse stability.

The damping element 23 here is embodied as a deformable plate, which in absorbing energy is deformed under a predetermined buckling load and thereby permits the pivoting movement described above.

FIG. 4 shows corresponding exemplary embodiments of damping elements. In FIG. 4a the damping element 23 has a U-shaped profile and has curved bends 32 in its side walls to act as set buckling point. In FIG. 4b the element has multiple holes to form set buckling points 32' in a longitudinal direction. In FIG. 4c the profile is rectilinear, whilst in FIG. 4d it is bent over as set buckling points 32'. In FIG. 4e a shock absorber described in the introductory part is shown as damping element. In all cases the damping element has holes 33 and 34 on both sides for fixing in the bearings 15 and 12.

Figure 5A:
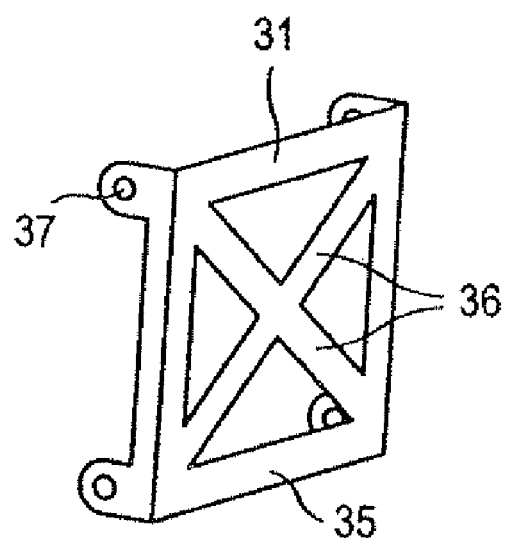
FIG. 5 shows two variants of a cross-bracing plate used in the present invention.
Figure 5B:
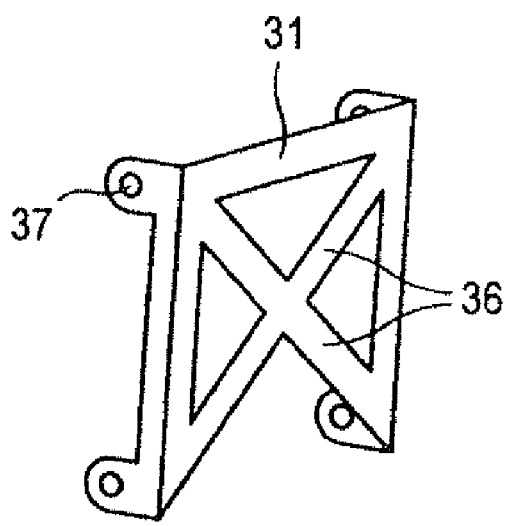

FIG. 5 shows two exemplary embodiments of the cross-bracing plate 31. In the exemplary embodiment in FIG. 5 it is a rectangular frame 35 having two diagonal struts 36, the frame 35 being bent over on two legs to form tie pieces 37, which have corresponding holes for fixing to the pivoted levers such as 14, for example. In the exemplary embodiment in FIG. 5b the cross-bracing plate is a U-shaped frame having two diagonal struts 36 and the corresponding holes. Instead of flat plates, rods consisting of round bars or having some other profile may also be used.

Figure 6:
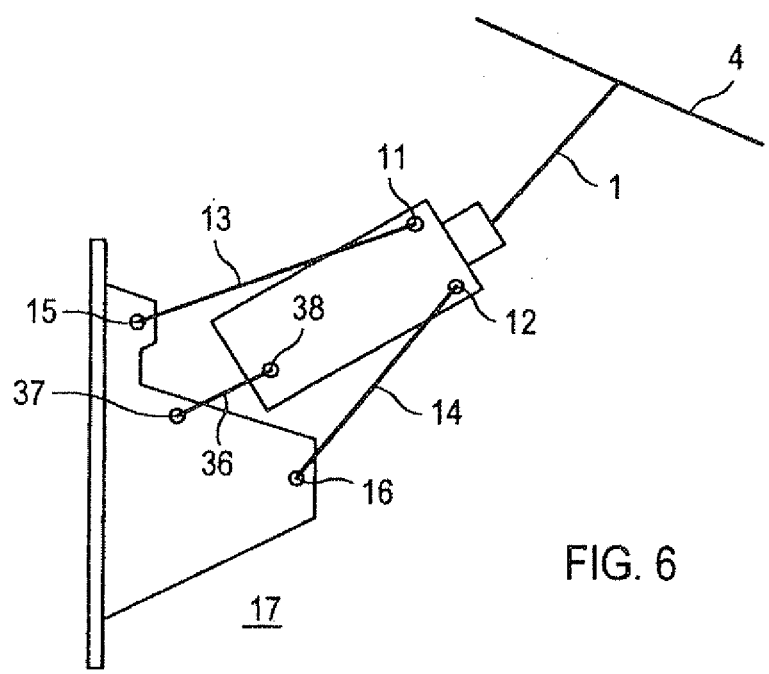
FIG. 6 shows a variant of the steering column arrangement according to the present invention having a further damping element.
Figure 6A:
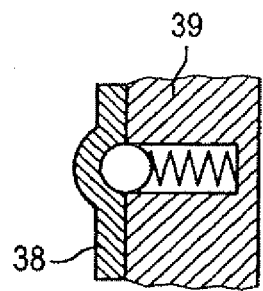
Figure 6B:
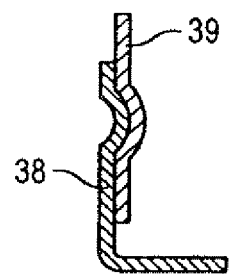
Figure 6C:
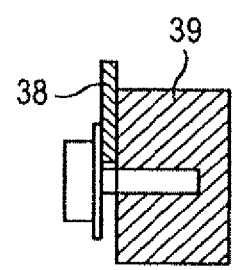
Figure 7:
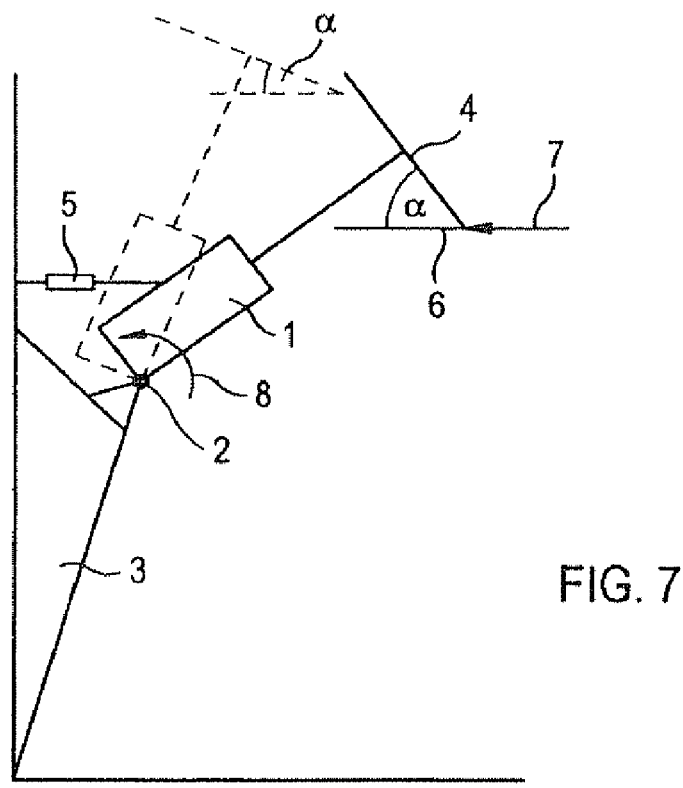
FIG. 7 is understood to show a steering column arrangement according to the state of the art.
Figure 8:
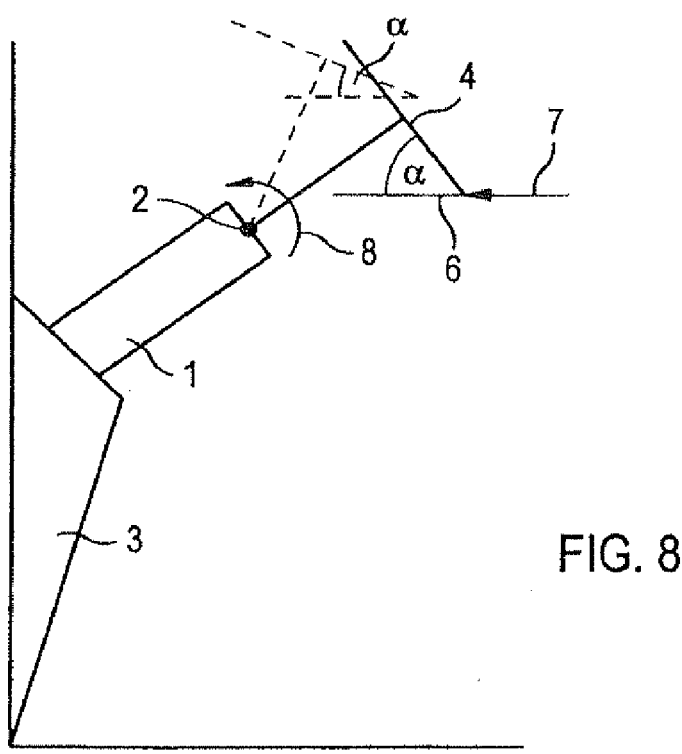
FIG. 8 is understood to show another steering column arrangement according to the state of the art.

FIG. 6 shows, again in schematic form, that the steering column arrangement may be connected to the pedal unit 17 via an additional damping element 36, again by pivot joints 37 and 38, the damping element 36 being of variable length in order to permit the movements described. The damping element 36 serves primarily for damping vibrations and oscillatory movements. According to FIG. 6a the variability in length can be achieved in that two elements 38 and 39 are displaceable relative to one another and slide frictionally against one another. In the exemplary embodiment in FIG. 6a the two elements 38 and 39 are tensioned against one another by a tensile spring. In the exemplary embodiment in 6b the two elements 38 and 39 are bonded together by way of a bead, the bond tearing open once a specific force is reached. In FIG. 6c the two elements 38 and 39 are bolted together and can be detached from one another under a predetermined force.

Finally it should also be pointed out that the steering column arrangement can naturally also be fitted to other vehicle parts, for example to the firewall of the driver's cab or also to other parts of the vehicle body. It should further be mentioned that the entire structure is solidly fixed in respect of forces acting in the opposite direction to the arrow 7, since the damping element 23 and 36 must be designed so that it will prevent said movement. In the exemplary embodiments it is therefore only capable of shortening, that is to say collapsing, but it is not expandable or extensible.

The invention claimed is:

1. A steering column arrangement, comprising:
   at least two pivoted levers;
   a steering column; and
   a steering wheel, which is oriented at an angle to a horizontal, wherein the steering column is connected to the at least two pivoted levers, which each have a pivot bearing at both ends;
   wherein the pivot bearings situated on a side of the pivoted levers remote from the steering wheel being fixedly attached,
   wherein the pivot bearings attached to the other end of the pivoted levers are arranged at a reciprocal distance from the steering column, and
   wherein the arrangement of the pivoted levers and the pivot bearings is selected so that under a force acting on the steering wheel in a direction of travel, the steering wheel and the steering column are moved simultaneously in the direction of travel and the steering wheel increases the angle.

2. The steering column arrangement of claim 1, wherein the pivot bearings are arranged at corners of a convex quadrilateral having sides that are not parallel.

3. The steering column arrangement of claim 1, further comprising:
   at least one damping element, which on one side is fixedly connected and on the other side is connected to at least one moving part of the steering column arrangement,
   wherein the damping element includes pivot bearings on both sides and is configured so that it collapses, absorbing kinetic energy, when it is subjected to a force which is greater than a predetermined threshold.

4. The steering column arrangement of claim 1, wherein the pivoted levers are arranged in pairs on both sides of the steering column and are connected together in pairs by cross-bracing plates.

5. The steering column arrangement of claim 4, wherein the damping element is provided in pairs on both sides of the steering column.

6. The steering column arrangement of claim 1, wherein the steering column arrangement is attached to a pedal unit of a vehicle.

7. The steering column arrangement of claim 1, further comprising:
   at least one damping element, which on one side is fixedly connected and on the other side is connected to at least one moving part of the steering column arrangement;
   wherein the damping element includes pivot bearings on both sides and is configured so that it collapses, absorbing kinetic energy, when it is subjected to a force which is greater than a predetermined threshold, and
   wherein the pivot bearings are arranged at corners of a convex quadrilateral having sides that are not parallel.

8. The steering column arrangement of claim 7, wherein the pivoted levers are arranged in pairs on both sides of the steering column and are connected together in pairs by cross-bracing plates.

9. The steering column arrangement of claim 8, wherein the damping element is provided in pairs on both sides of the steering column.

10. The steering column arrangement of claim 9, wherein the steering column arrangement is attached to a pedal unit of a vehicle.

11. The steering column arrangement of claim 8, wherein the steering column arrangement is attached to a pedal unit of a vehicle.

12. The steering column arrangement of claim 7, wherein the steering column arrangement is attached to a pedal unit of a vehicle.

* * * * *